(12) United States Patent
Beck et al.

(10) Patent No.: US 7,726,438 B2
(45) Date of Patent: Jun. 1, 2010

(54) HYDRAULIC SYSTEM

(75) Inventors: Jochen Beck, Elchingen (DE); Dieter Roth, Schlüchtern (DE)

(73) Assignee: Brueninghaus Hydromatik GmbH, Elchingen (DE)

( * ) Notice: Subject to any disclaimer, the term of this patent is extended or adjusted under 35 U.S.C. 154(b) by 959 days.

(21) Appl. No.: 10/564,686

(22) PCT Filed: Jun. 1, 2004

(86) PCT No.: PCT/EP2004/005904

§ 371 (c)(1),
(2), (4) Date: Jul. 20, 2006

(87) PCT Pub. No.: WO2005/007488

PCT Pub. Date: Jan. 27, 2005

(65) Prior Publication Data

US 2007/0017730 A1 Jan. 25, 2007

(30) Foreign Application Priority Data

Jul. 11, 2003 (DE) .................................. 103 31 534

(51) Int. Cl.
*B62D 5/09* (2006.01)
(52) U.S. Cl. ............................ 180/432; 180/441; 180/442
(58) Field of Classification Search ................... 180/417, 180/432, 433, 439, 441, 442
See application file for complete search history.

(56) References Cited

U.S. PATENT DOCUMENTS

| | | | |
|---|---|---|---|
| 2,816,420 A | 12/1957 | Walsh | |
| 3,370,422 A | 2/1968 | Carlson et al. | |
| 3,437,166 A * | 4/1969 | Stauffer | 180/432 |
| 3,554,312 A | 1/1971 | Niedermeier et al. | |
| 3,589,465 A * | 6/1971 | Harding | 180/432 |
| 4,367,803 A | 1/1983 | Wittren | |
| 4,424,672 A * | 1/1984 | Kalhorn | 60/385 |
| 5,937,966 A * | 8/1999 | Li | 180/432 |
| 5,953,978 A * | 9/1999 | Bohner et al. | 91/363 A |
| 6,438,950 B1 * | 8/2002 | Peistrup et al. | 60/385 |

FOREIGN PATENT DOCUMENTS

| | | |
|---|---|---|
| DE | 35 36 563 A1 | 10/1985 |
| FR | 1.251.296 | 12/1959 |
| WO | WO 99/55573 | 11/1999 |

* cited by examiner

*Primary Examiner*—Anne Marie M Boehler
(74) *Attorney, Agent, or Firm*—Scully, Scott, Murphy & Presser, P.C.

(57) ABSTRACT

Disclosed is a hydraulic steering system (100) for a vehicle, especially a mobile working machine, comprising at least two steering cylinders (1, 2) within which two cylinder pistons (3, 4) can be displaced, and a first hydraulic pump (14) that can be adjusted regarding the swept volume. The position or the direction of displacement of the cylinder pistons (3, 4) in the steering cylinders (3, 4) defines the steering angle or the steering direction of the steerable vehicle wheels relative to a body (5) of the vehicle. The displaceable cylinder pistons (3, 4) divide the associated steering cylinder (1, 2) into two respective pressure chambers (6 and 7, 8 and 9). The first connection (46) of the adjustable hydraulic pump (14) is joined to one of the pressure chambers (6 or 7, 8 or 9) of the two steering cylinders (1, 2) according to the steering direction while the second connection (15) thereof is joined to the other respective pressure chamber (6 or 7, 8 or 9) of the two steering cylinders (1, 2) in a closed circuit.

18 Claims, 2 Drawing Sheets

HYDRAULIC SYSTEM

Figure 1:
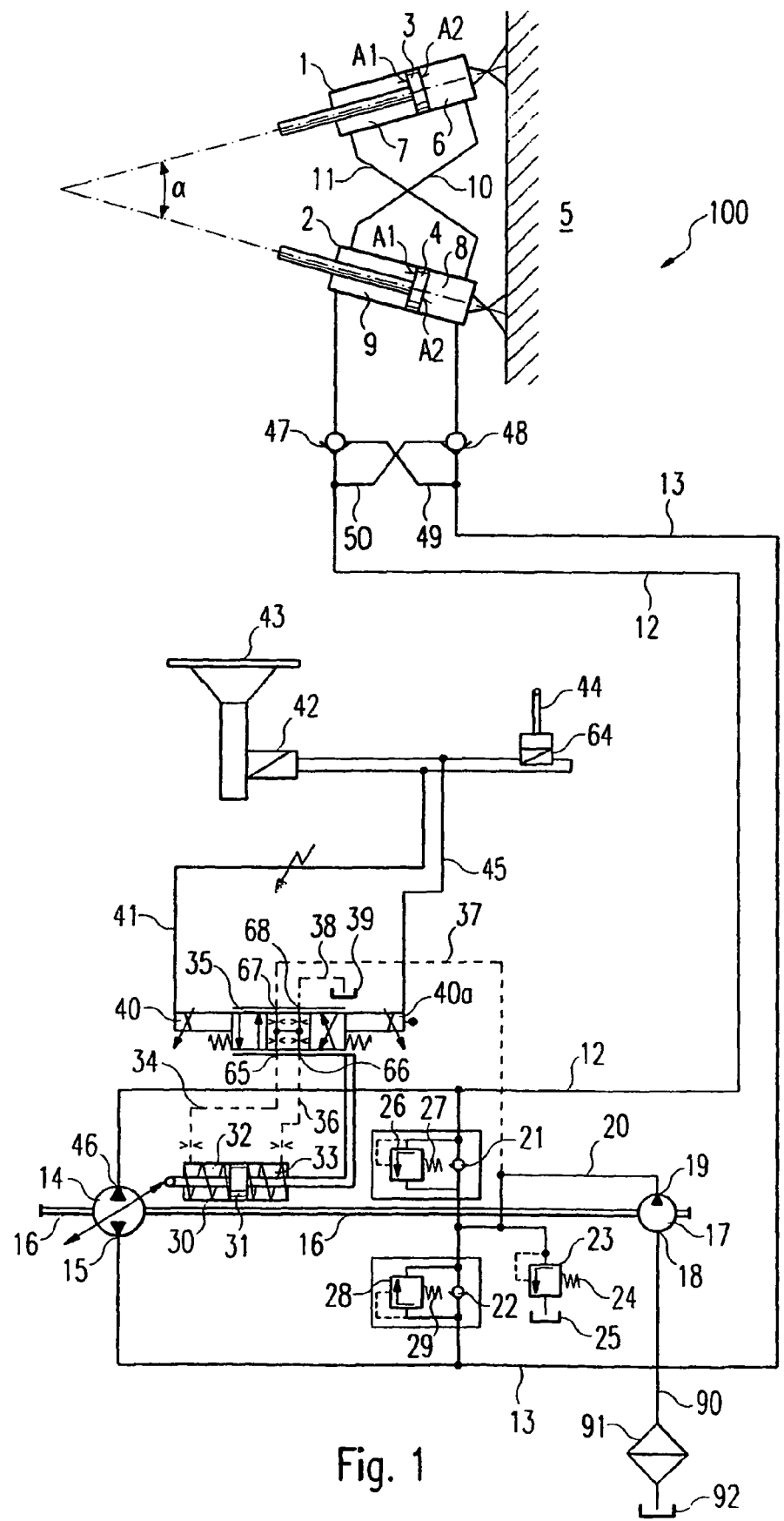

The invention relates to a hydraulic steering system for mobile machinery.

In vehicles having a hydraulic system for implement operation—e.g. wheeled loaders, excavators, combine harvesters and fork lift trucks—the steering system is generally also hydraulic. The reasons for this lie in identical demands of the machinery and the vehicle steering system on the control system—e.g. high actuating energy—and in the cost-minimizing utilization of common hydraulic units such as e.g. hydraulic pumps or control blocks for the mobile machinery and the vehicle steering system.

In a hydraulic steering system according to WO 99/55573 A1, steering of the vehicle is effected by means of two steering cylinders, the adjusting pistons of which are mechanically connected to the vehicle axle and displaceable in the respective steering cylinder. For the displacement of the adjusting piston in the respective steering cylinder, the position of which in the steering cylinder fixes the steering direction and steering angle of the vehicle, defined adjusting pressures are summoned up in the two adjusting pressure chambers of the respective steering cylinder that are separated by the adjusting piston. Setting of the adjusting pressure level for the respective adjusting pressure chamber that corresponds to the steering angle of the vehicle as well as correct feeding of the correctly set adjusting pressure into the adjusting pressure chamber in the two steering cylinders that is appropriate for the intended steering direction of the vehicle is effected in different ways depending on the steering organ used.

If a steering wheel is used as a steering organ, then a hydrostatic steering unit that is varied by means of the steering wheel is used to distribute the hydraulic fluid, which is delivered by a pressure- and flow-rate-controlled hydraulic pump, to the two adjusting pressure chambers of the two steering cylinders in the correct manner for the steering direction and steering angle. In the case of a joystick as a steering organ, a pilot unit is used to generate in dependence upon the joystick deflection a control pressure pair, which is supplied to the control inputs of a control valve in a control block. The deflection of the control valve piston that is produced by the control pressure pair leads to feeding of the hydraulic fluid, which prevails at the input of the control valve and is delivered by the pressure- and flow-rate-controlled hydraulic pump, into the two adjusting pressure chambers of the two steering cylinders in the correct manner for the steering direction and steering angle. Instead of hydraulic activation, electrical activation by means of an electrical signal supplied by the joystick may be realized at an electrical actuating solenoid provided at the adjusting valve. By means of a priority valve the hydraulic fluid volume delivered by the hydraulic pump is metered load-dependently for the hydrostatic steering unit or the control block.

Entirely central to this realization of the vehicle steering system is the fact that, depending on the intended steering angle and the intended steering direction of the vehicle, the two adjusting pressure chambers in the two steering cylinders are loaded with an in each case complementary adjusting pressure corresponding to the steering direction and the steering angle. This presupposes that the pressure differences between the two adjusting pressure chambers of, in each case, one steering cylinder have to assume positive and negative values in accordance with the intended steering direction and the intended steering angle. As the hydraulic pump in WO 99/55573 A1 is operated in an open circuit and therefore has only one flow direction, the positive or negative adjusting pressure difference between the two adjusting pressure chambers in, in each case, one steering cylinder that corresponds to the intended steering direction and the intended steering angle cannot be supplied directly by the hydraulic pump. Rather, in such a hydraulic circuit in the load circuit additional hydraulic units—for example, a hydraulic steering unit or a control block—are needed to feed the hydraulic fluid in the load circuit to the respective adjusting pressure chambers in the two steering cylinders in a correct manner for the steering direction and steering angle.

These additional hydraulic units lead to a not inconsiderable increase of the investment costs of a hydraulic steering system. The insertion of additional hydraulic units also entails an extra outlay for piping and screw connections, which especially at the connection points incurs the risk of additional oil leakage points. On the whole, the additional hydraulic units and extra piping increase the spatial requirement for the hydraulic steering system. There is also an increased outlay for assembly, maintenance and servicing owing to extra components in the hydraulic system. The insertion in particular of variable control valves in the hydraulic lines for feeding the hydraulic fluid into the respective adjusting pressure chambers of the two steering cylinders in a correct manner for the steering angle and steering direction leads, in comparison to a load circuit without variable control valves, to an additional increase of the flow resistance levels in the hydraulic circuit that is linked to unnecessary hydraulic energy losses.

The underlying object of the invention is therefore to develop the hydraulic steering system for a mobile machine having the features according to the preamble of claim 1 in such a way that the two adjusting pressure chambers of the two steering cylinders are supplied in accordance with the intended steering direction and the intended steering angle of the vehicle with a hydraulic fluid at the adjusting pressure needed for this purpose in each case directly from the hydraulic pump without the insertion of additional control- and adjusting devices in the load circuit.

The object of the invention is achieved by means of a hydraulic steering system having the features of claim 1.

In contrast to the open circuit of the hydraulic steering system in WO 99/55573 A1, in the invention a closed circuit is used. It is therefore possible through variation of the hydraulic fluid flow by means of a variation device to generate at the two ports of the hydraulic pump positive and negative adjusting pressure differences of variable pressure level, which may be supplied directly and without the insertion of complex hydraulic units to the inputs of the two adjusting pressure chambers of the two steering cylinders. Thus, through variation of the volumetric displacement of the hydraulic pump the adjusting pressures required for the desired steering angle and the desired steering direction may be set relatively easily in the two adjusting pressure chambers of the two steering cylinders.

Besides elimination of the previously described drawbacks that are characteristic of a realization according to WO 99/55573 A1, in a closed circuit vacuums, such as may arise in the case of expanding adjusting pressure chambers connected in an open circuit to a hydraulic tank, no longer occur. These vacuums lead, in the respective adjusting pressure chambers, to cavitation and hence progressive damage to the steering cylinder and the seals.

Advantageous developments of the invention are indicated in the dependent claims.

When the pressure chambers have different pressurization areas, a crosswise changeover of the chambers is meaningful in order to ensure that the total displaced volume per distance in both adjusting directions is identical. Otherwise, operation in the closed circuit is not possible.

Setting of the steering direction and the steering angle may be actuated by means of a steering wheel or a joystick as a steering organ.

In a first embodiment of the invention, the control signals proportional to the deflection of the steering wheel or joystick may take the form of electrical signals. In this case, the electrical signals proportional to the deflection of the steering wheel and/or joystick activate in each case an electrical actuating solenoid at the control inputs of an adjusting valve, by means of which the two adjusting pressure chambers of the variation device of the hydraulic pump is loaded with adjusting pressure.

In a second embodiment of the invention, instead of electrical activation, hydraulic activation is used. The steering wheel influences the adjusting pressure, which is generated by a hydraulic pump and fed into the control pressure chamber of the adjusting valve. The deflection of the joystick varies the adjusting pressure, which is generated in a pilot unit and fed likewise into the adjusting pressure chambers of the adjusting valve.

Figure 2:
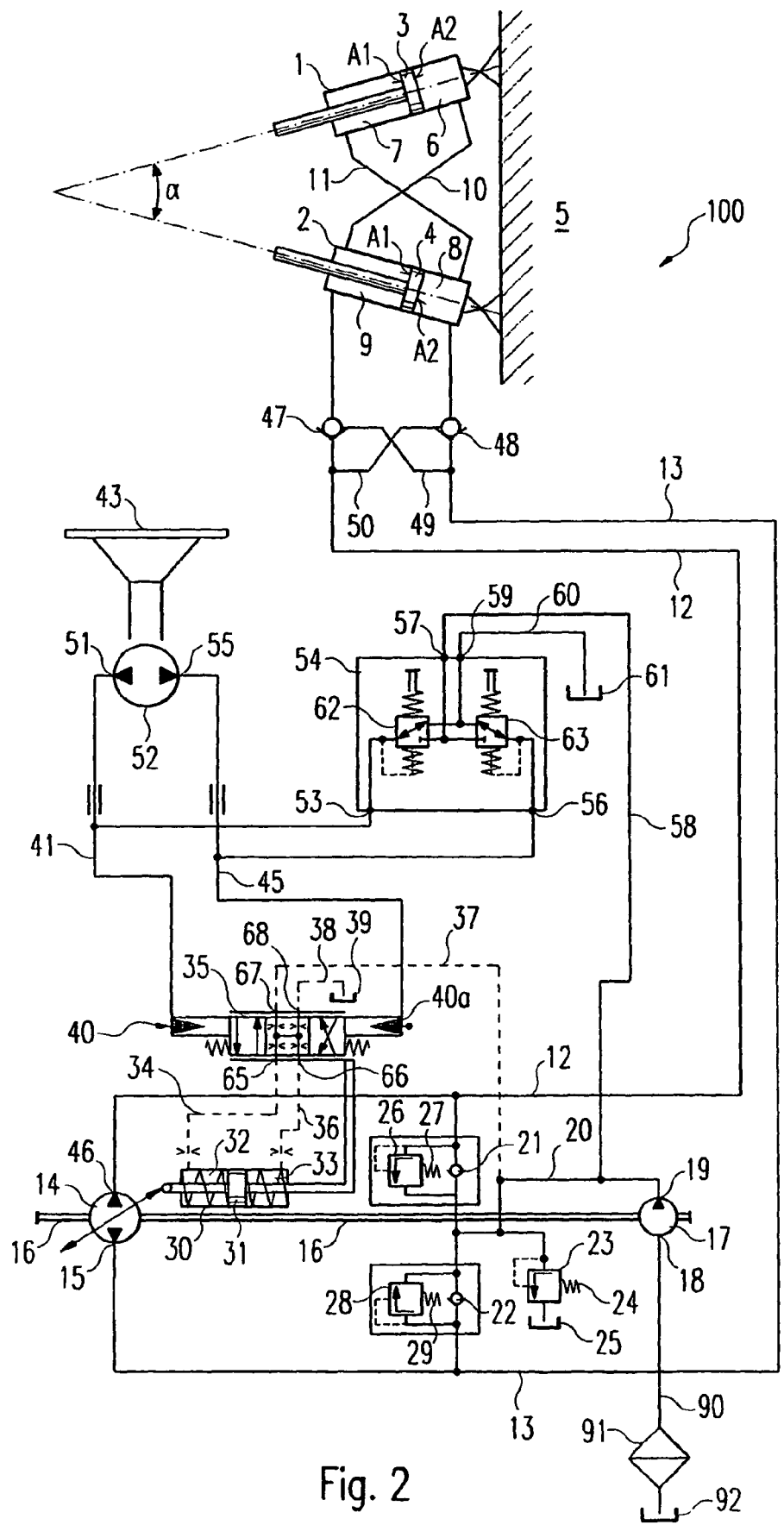

Two embodiments of the invention are illustrated in the drawings and described in detail below. The drawings show:

FIG. 1 a block diagram of a first embodiment of the hydraulic steering system according to the invention for a vehicle and FIG. 2 a second embodiment of the hydraulic steering system according to the invention for a vehicle.

The hydraulic steering system 100 according to the invention for a vehicle is described below in its first embodiment with reference to FIG. 1.

In FIG. 1 a block diagram of a hydraulic steering system 100 for a vehicle is illustrated, which comprises a first steering cylinder 1 and a second steering cylinder 2. Displaceably guided in the steering cylinder 1 is an adjusting piston 3, which is mechanically coupled to the, in terms of steering direction and steering angle, variable vehicle wheels or front vehicle (articulated steering). Displaceably guided in the steering cylinder 2 is the adjusting piston 4, which is likewise mechanically coupled to the, in terms of steering direction and steering angle, variable vehicle wheels. Each of the first and second steering cylinders 1 and 2 is mechanically connected at its piston-side end to the vehicle body 5.

The first steering cylinder 1 has a piston-side adjusting pressure chamber 6 and a piston-rod-side adjusting pressure chamber 7. The second steering cylinder 2 likewise has a piston-side adjusting pressure chamber 8 and a piston-rod-side adjusting pressure chamber 9.

In order to achieve a deflection of the vehicle wheels in a specific steering direction at a specific steering angle through mechanical displacement of the adjusting pistons 3 and 4 of the first and second steering cylinders 1 and 2, the first and second steering cylinders 1 and 2 are, with regard to their adjusting piston rods 3 and 4, oriented relative to one another at an angle α of up to max. 90°. In order to achieve an equal effect of both adjusting piston movements of the first and second steering cylinders 1 and 2 upon the turning of the vehicle wheels and/or articulated steering in a specific turning direction and at a specific turning angle, the piston-side adjusting pressure chamber 6 of the first steering cylinder 1 is connected by a hydraulic line 10 to the piston-rod-side adjusting pressure chamber 9 of the second steering cylinder 2. Equally, in this sense the piston-side adjusting pressure chamber 7 of the first steering cylinder 1 is connected by a hydraulic line 11 to the piston-side adjusting pressure chamber 8 of the second steering cylinder 2.

The piston-rod-side adjusting pressure chamber 9 of the second steering cylinder 2 is connected by a first hydraulic load line 12 to the first port 46 of a variable first hydraulic pump 14. The piston-side adjusting pressure chamber 8 of the second steering cylinder 2 is connected by a second hydraulic load line 13 to the second port 15 of the variable first hydraulic pump 14. The variable first hydraulic pump 14 is driven via a drive shaft 16 by a prime mover (not shown in FIG. 1), for example a diesel-driven generating set.

An, in each case, first pressure chamber 7, 9 adjoins the associated cylinder piston 3, 4 with a pressurization area A1 that is smaller than the pressurization area A2, with which the, in each case, other second pressure chamber 6, 8 adjoins the corresponding cylinder piston 3, 4. Each port 46, 15 of the hydraulic pump 14 is connected to a first pressure chamber 7, 9 having a smaller pressurization area A1 and to a second pressure chamber 8, 6 having a larger pressurization area A2. The effect achieved by this crosswise connection is that the volume displaced, on the one hand, and the volume replenished, on the other hand, by the cylinder pistons 3 and 4 upon displacement in one of the two displacement directions are of equal magnitude. This enables a closed-circuit operation because, in this way, the volume displaced at the hydraulic pump 14 e.g. at the port 46 corresponds to the volume replenished at the hydraulic pump at the other port 15, and vice versa.

A feed pump 17 is driven likewise via the drive shaft 16 by the prime mover. The feed pump 17 in the present case is a hydraulic pump operating in single-quadrant mode, the low-pressure port 18 of which is connected by a hydraulic line 90 via a filter device 91 to a hydraulic tank 92.

With regard to a pressure limitation, the high-pressure port 19 of the feed pump 18 is connected by a hydraulic line 20 to a pressure relief valve 23. One of the two control ports of the pressure relief valve 23 is connected to the hydraulic line 20. At the other control input of the pressure relief valve 23 a specific upper pressure limit value may be set by means of a spring 24. If the pressure in the hydraulic line 20 exceeds the upper pressure limit value set by the spring 24, then the pressure relief valve 23 opens and connects the hydraulic line 20 to the hydraulic tank 25. The pressure in the hydraulic line 20 is subsequently reduced until a pressure corresponding to the upper pressure limit value arises in the hydraulic line 20 and the pressure relief valve 23 changes back to the blocked state.

The high-pressure port 19 of the feed pump 17 is connected by the hydraulic line 20 to a first non-return valve 21 and a second non-return valve 22. The non-return valve 21 is connected by its second port to the hydraulic line 12, while the non-return valve 22 is connected by its second port to the hydraulic line 13. If the pressure in the first hydraulic load line 12 drops below the pressure level fixed in the hydraulic line 20 by means of the pressure relief valve 23, then the non-return valve 21 opens and adapts the pressure in the first hydraulic load line 12 to the pressure prevailing in the hydraulic line 20. In a totally analogous manner, if the pressure in the second hydraulic load line 13 drops below the pressure level prevailing in the hydraulic line 20, the non-return valve 22 opens and adapts the pressure in the second hydraulic load line 13 to the pressure prevailing in the hydraulic line 20.

Connected parallel to the non-return valve 21 is a pressure relief valve 26. This pressure relief valve 26 compares the pressure value at one of its control inputs in the first hydraulic load line 12 with the setpoint pressure value set at the other control input by means of a spring 27 and opens if the pressure in the first hydraulic load line 12 exceeds the setpoint pressure value set by means of the spring 27. In said case, the pressure in the first hydraulic load line 12 is relieved via the pressure relief valve 26 into the hydraulic line 20 until the pressure in the first hydraulic load line 12 corresponds to the setpoint pressure value set at the pressure relief valve 26 by means of the spring 27 and the pressure relief valve 26 changes back to the blocked state.

In an analogous manner, a second pressure relief valve 28 is connected parallel to the non-return valve 22. This pressure relief valve 28 compares the pressure prevailing in the second hydraulic load line 13 and fed across one of its control inputs with a setpoint pressure value set by means of a spring 29 at its other control input and opens if the pressure in the second hydraulic load line 13 exceeds the setpoint pressure value set by means of the spring 29. In said case, the pressure in the second hydraulic load line 13 is relieved via the pressure relief valve 28 in the hydraulic line 20 until the pressure in the second hydraulic load line 13 corresponds to the setpoint pressure value set by means of the spring 29 and the pressure relief valve 28 changes back to the blocked state.

Activation of the variable first hydraulic pump 14 is effected by means of a variation device 30, the variation piston 31 of which is mechanically connected to the swash plate (not shown in FIG. 1) of the hydraulic pump 14. The variation piston 31 divides the variation device 30 into a first adjusting pressure chamber 32 and a second adjusting pressure chamber 33. The first adjusting pressure chamber 32 is connected by a hydraulic line 34 to the first output 65 of an adjusting valve 35, which takes the form of a 4/3-way valve. The second adjusting pressure chamber 33 is connected by a hydraulic line 36 to the second output 66 of the adjusting valve 35. The first input 67 of the adjusting valve 35 is connected by a hydraulic line 37 and the hydraulic line 20 to the high-pressure port 19 of the feed pump 18. The second input 68 is connected by a hydraulic line 38 to a hydraulic tank 39.

Activation of the adjusting valve 35 is effected by means of a first control input 40 and a second control input 40a, which are both designed as electric actuating solenoids. By an electric line 41 the electric actuating solenoid of the first control input 40 is connected on the one hand to a first output of a first transducer 42, which converts the mechanical deflection at a first steering organ 43 in the form of a steering wheel into a corresponding electrical signal, and to a first output of a second transducer 64, which converts the mechanical deflection at a second steering organ 44 in the form of a joystick (manual control device) into a corresponding electrical signal. The electric actuating solenoid of the second control input 40a is likewise connected by an electric line 45 to a second output of the transducer 42 of the steering organ 43 in the form of a steering wheel and to a second output of the transducer 64 of the second steering organ 44 in the form of a joystick.

When the vehicle driver intends the vehicle wheels to turn to the left, the vehicle driver carries out a corresponding turn to the left at the first steering organ 43. Alternatively, when the vehicle driver intends the vehicle wheels to turn to the left, he may displace the second steering organ 44 in a deflection direction corresponding to the turning of the vehicle wheels to the left. A safety interlock of the first and second steering organs 43 and 44, which is not illustrated in FIG. 1, ensures that both steering organs cannot be used simultaneously by the vehicle driver.

This deflection of one of the two steering organs corresponding to the turning of the vehicle wheels is converted by the respective transducers 42 and 64 into an electrical signal, which is supplied via the electric line 41 to the electric actuating solenoid at the first control input 40 of the adjusting valve 35. The electric actuating solenoid at the first control input 40 leads to a deflection of the adjusting valve 35, so that the first adjusting pressure chamber 32 of the variation device 30 is connected by the hydraulic line 34, 37 and 20 to the high-pressure port 19 of the feed pump 17 and the second adjusting pressure chamber 33 of the variation device 30 is connected by the hydraulic line 36 and 38 to the hydraulic tank 39. The variation piston 31 of the variation device 30 is then displaced in the direction of a higher adjusting pressure at the first port 46 of the variable first hydraulic pump 14.

This higher adjusting pressure at the first port 46 of the variable first hydraulic pump 14 is supplied via the first hydraulic load line 12 to the piston-rod-side adjusting pressure chamber 9 of the second steering cylinder 2 and leads to a displacement of the adjusting piston 4 in the direction of the piston-side adjusting pressure chamber 8. The higher adjusting pressure in the first hydraulic load line 12 is supplied via the hydraulic line 10 to the piston-side adjusting pressure chamber 6 of the first steering cylinder 1, so that the adjusting piston 3 is displaced in the direction of the piston-rod-side adjusting pressure chamber 7. Both the deflection of the adjusting piston 3 of the first steering cylinder 1 and the deflection of the adjusting piston 4 of the second steering cylinder 2 lead to a turn to the left of the vehicle wheels and/or articulated steering.

When the vehicle driver intends the vehicle wheels to turn to the right, the first steering organ 43 is guided into a corresponding turn to the right or alternatively the second steering organ 44 is guided in a deflection direction corresponding to the turn to the right of the vehicle wheels, so that the respective transducers 42 and 64 generate an electrical signal that is supplied via the electric line 45 to the electric actuating solenoid at the second control input 41 of the adjusting valve 35. The adjusting valve 35 is deflected by the electric actuating solenoid at the second control input 41 in such a way that the first adjusting pressure chamber 32 of the variation device 30 is connected by the hydraulic line 34 and 38 to the hydraulic tank 39 and the second adjusting pressure chamber 33 of the variation device 30 is connected by the hydraulic line 36, 37 and 20 to the high-pressure port 19 of the feed pump 17. The variation piston 31 of the variation device 30 is displaced in the direction of a higher adjusting pressure at the second port 15 of the variable first hydraulic pump 14.

This higher adjusting pressure at the second port 15 of the variable first hydraulic pump 14 is fed via the second hydraulic load line 13 into the piston-side adjusting pressure chamber of the second steering cylinder 2 and leads there to a deflection of the adjusting piston 4 in the direction of the piston-rod-side adjusting pressure chamber 9. The higher adjusting pressure in the second hydraulic load line 13 is supplied via the hydraulic line 11 to the piston-rod-side adjusting pressure chamber 7 of the first steering cylinder 1 and leads there to a deflection of the adjusting piston 3 in the direction of the piston-side adjusting pressure chamber 6. The deflection of the adjusting piston 3 of the first steering cylinder 1 and the deflection of the adjusting piston 4 of the second steering cylinder 2 lead to a turn to the right of the vehicle wheels.

In order in the event of failure of the variable first hydraulic pump 14 to prevent an escape of the hydraulic fluid from the adjusting pressure chambers 6 to 9 of the first and second steering cylinders 1 and 2 and hence an unwanted displacement of the steering angle and/or steering direction of the vehicle wheels during travel, in the first hydraulic load line 12 a controllable non-return valve 47 and in the second hydraulic load line 13 a further controllable non-return valve 48 is inserted. The opener of the non-return valve 47 is connected by a hydraulic line 49 to the steering-cylinder-side port of the non-return valve 48 in the second hydraulic load line 13. In an entirely analogous manner, the opener of the non-return valve 48 is connected by the hydraulic line 50 to the steering-cylinder-side port of the non-return valve 47 in the first hydraulic load line 12. It is thereby guaranteed that both non-return valves 47 and 48 in the first and second hydraulic load lines 12 and 13 are open simultaneously and so the hydraulic fluid quantity, which is supplied through the first or second hydraulic load line 12 or 13 to the steering cylinders, may be returned in the, in each case, complementary second or first hydraulic load line 13 or 12 within the closed circuit to the variable first hydraulic pump 14.

In contrast to the first embodiment of the hydraulic steering system 100 according to the invention of FIG. 1, in which electric activation of the adjusting valve 35 is realized, FIG. 2 shows a second embodiment of the hydraulic steering system 100 according to the invention with hydraulic activation of the adjusting valve 35. For the sake of uniformity, in FIG. 2 identical reference characters are used for components that are identical to FIG. 1.

Instead of the electric actuating solenoids, the first control input 40 and the second control input 41 have in each case an adjusting pressure chamber for hydraulic activation of the adjusting valve 35. The adjusting pressure chamber of the first control input 40 is supplied through the hydraulic line 41 either by the pressure at the first port 51 of the variable second hydraulic pump 52 or by the pressure at the first output 53 of the pilot unit 54. In an entirely analogous manner, the adjusting pressure chamber of the second control input 41 is supplied through the hydraulic line 45 by the pressure at the second port 55 of the variable second hydraulic pump 52 or by the pressure at the second output 56 of the pilot unit 54. The adjusting pressure prevailing at the first and second ports 51 and 52 of the variable second hydraulic pump 52 may be set by a variation device (not shown in FIG. 2) by virtue of appropriate turning of a first steering organ 43 in the form of a steering wheel, which is mechanically connected to the variation device.

The first input 57 of the pilot unit 54 is connected by a hydraulic line 58 to the high-pressure port 19 of the feed pump 17. The second input 59 of the pilot unit 54 is connected by a hydraulic line 60 to a hydraulic tank 61. By means of the two pressure relief valves 62 and 63, both inputs of which are connected in each case to the first and second input 57 and 59 of the pilot unit 54, the adjusting pressure prevailing at the first and second output 53 and 56 may be set through deflection of the second steering organ 44 in the form of a joystick. For this purpose, the mechanical deflection of the second steering organ 44 is conducted to one of the two control inputs of the two pressure reduction valves 60 and 63. In proportion to the pressure difference between the control pressure, which is produced by the deflection of the second steering organ 44 at one of the two control inputs of the pressure reduction valve 62, and the adjusting pressure at the first output 53 of the pilot unit 54 that is conducted to the other control input of the pressure reduction valve 62, the pressure reduction valve 62 puts through to the first output 53 of the pilot unit 54 a proportional pressure between the pressures prevailing at the first and second input 57 and 59 of the pilot unit 54. In an analogous manner, in proportion to the pressure difference between the control pressure, which is produced by the deflection of the second steering organ 44 at one of the two control inputs of the pressure reduction valve 63, and the adjusting pressure at the second output 56 of the pilot unit 54 that is conducted to the other control input of the pressure reduction valve 63, the pressure reduction valve 62 puts through to the second output 56 of the pilot unit 54 a propor-tional pressure between the pressures prevailing at the first and second input 57 and 59 of the pilot unit 54.

The effect achievable by means of the safety interlock of the first and second steering organs 43 and 44, which has already been mentioned in the description of the first embodiment of the hydraulic steering system 100 according to the invention and is likewise not shown in FIG. 2, is that the vehicle driver alternatively uses only one of the two steering organs 43 and 44. It is thereby guaranteed that in the two hydraulic lines 41 and 45 in each case only one adjusting pressure pair of the variable second hydraulic pump 52 or of the pilot unit 54 arises.

As the mode of operation of the variation of the variable first hydraulic pump 14 by means of the variation device 30, which is activated by the adjusting valve 35, and the mode of operation of the steering cylinder arrangement in the second embodiment of the hydraulic steering system 100 according to the invention corresponds to the mode of operation of the corresponding components in the first embodiment of the hydraulic steering system 100 according to the invention, there is no need at this point for a repeat description of this mode of operation.

The invention claimed is:

1. Hydraulic steering system for a vehicle having at least two steering cylinders, in which cylinder pistons are displaceable, the position and/or direction of motion of which in the steering cylinders fix the steering angle and/or steering direction of steerable vehicle wheels relative to a body of the vehicle, wherein each of the displaceable cylinder pistons divides the associated steering cylinder into in each case two pressure chambers and having an, in terms of the volumetric displacement, variable first hydraulic pump, a first port of which is connected, depending on the steering direction to one of the pressure chambers of the first steering cylinder and to one of the pressure chambers of the second steering cylinder, wherein a second port of the variable first hydraulic pump is connected in a closed circuit to the other pressure chamber of the first steering cylinder and to the other pressure chamber of the second steering cylinder, and wherein the first input port of a 4/3-way adjusting valve is connected to the high-pressure port of a feed pump, the second input port thereof is connected to a hydraulic tank, the first output port thereof is connected to a first adjusting pressure chamber of a variation device and the second output port thereof is connected to a second adjusting pressure chamber of the variation device, wherein the variation of the first hydraulic pump in terms of the swiveling direction and the pressure medium volume delivered at its first port and the pressure medium volume delivered at its second port is effected by means of the variation device.

2. Hydraulic steering system according to claim 1, wherein in each case a first pressure chamber adjoins the associated cylinder piston with a pressurization area (A1) that is smaller than a pressurization area (A2), with which the in each case other second pressure chamber adjoins the corresponding cylinder piston, and that each port of the hydraulic pump is connected to a first pressure chamber with the pressurization area (A1) and to a second pressure chamber with the pressurization area (A2).

3. Hydraulic steering system according to claim 1, wherein setting of the swiveling direction of the hydraulic pump and of the pressure medium volume delivered at the first port and at the second port of the hydraulic pump is effected in dependence upon a deflection set at a steering wheel as a first steering organ and/or at a joystick as a second steering organ.

4. Hydraulic steering system according to claim 3, wherein in dependence upon the deflection of the first and/or second steering organ an adjusting valve is activated, whose first output is connected to a first adjusting pressure chamber of a variation device for activation of the variable first hydraulic pump and whose second output is connected to a second adjusting pressure chamber of the variation device.

5. Hydraulic steering system according to claim 4, wherein the deflection of the adjusting valve is effected by means of electric actuating solenoids at control ports, which receive from the first and/or second steering organ in each case an electrical adjusting signal, which is generated by an electrical transducer and corresponds to the deflection of the first or second steering organ.

6. Hydraulic steering system according to claim 4, wherein the deflection of the adjusting valve is effected by means of the adjusting pressures that act in the control chambers situated at the two control ports and correspond to the deflection of the first or second steering organ.

7. Hydraulic steering system according to claim 6, wherein at the first and second port of a variable second hydraulic pump adjusting pressures arise, which correspond to the deflection of the first steering organ.

8. Hydraulic steering system according to claim 6, wherein in a pilot unit two pressure reduction valves, the inputs of which are connected in each case to the high-pressure port of a feed pump and to a hydraulic tank, generate the adjusting pressures corresponding to the deflection of the second steering organ.

9. Hydraulic steering system according to claim 8, wherein a low-pressure port of the feed pump is connected by a filter to a hydraulic tank, and the high-pressure port of the feed pump is connected in each case by a non-return valve to a first hydraulic load line, which is connected to the first port of the first hydraulic pump, and to a second hydraulic load line, which is connected to the second port of the first hydraulic pump.

10. Hydraulic steering system according to claim 9, wherein in the first and second hydraulic load lines there is provided in each case a non-return valve.

11. Hydraulic steering system for a vehicle having at least first and second steering cylinders, in which cylinder pistons are displaceable, the position and/or direction of motion of which in the steering cylinders fix the steering angle and/or steering direction of steerable vehicle wheels relative to a body of the vehicle, wherein each of the displaceable cylinder pistons divides the associated steering cylinder into in each case two pressure chambers and having an, in terms of the volumetric displacement, variable first hydraulic pump, a first port of which is connected, depending on the steering direction to one of the pressure chambers of the first steering cylinder and to one of the pressure chambers of the second steering cylinder, wherein a second port of the variable first hydraulic pump is connected in a closed circuit to the other pressure chamber of the first steering cylinder and to the other pressure chamber of the second steering cylinder; wherein setting of the swiveling direction of the hydraulic pump and of the pressure medium volume delivered at the first port and at the second port of the hydraulic pump is effected in dependence upon a deflection set at a steering wheel as a first steering organ and/or at a joystick as a second steering organ; and wherein in dependence upon the deflection of the fast and/or second steering organ an adjusting valve is activated, whose first output is connected to a first adjusting pressure chamber of a variation device for activation of the variable first hydraulic pump and whose second output is connected to a second adjusting pressure chamber of the variation device.

12. Hydraulic steering system according to claim 11, wherein the deflection of the adjusting valve is effected by electric actuating solenoids at control ports, which receive from the first and/or second steering organ in each case an electrical adjusting signal, which is generated by an electrical transducer and corresponds to the deflection of the first or second steering organ.

13. Hydraulic steering system according to claim 11, wherein the deflection of the adjusting valve is effected by the adjusting pressures that act in the control chambers situated at the two control ports and correspond to the deflection of the first or second steering organ.

14. Hydraulic steering system according to claim 13, wherein at the first and second port of a variable second hydraulic pump adjusting pressures arise, which correspond to the deflection of the first steering organ.

15. Hydraulic steering system according to claim 13, wherein in a pilot unit two pressure reduction valves, the inputs of which are connected in each case to the high-pressure port of a feed pump and to a hydraulic tank, generate the adjusting pressures corresponding to the deflection of the second steering organ.

16. Hydraulic steering system according to claim 15, wherein an adjusting valve is a 4/3-way valve, wherein the first input port thereof is connected to the high-pressure port of a feed pump, the second input port thereof is connected to a hydraulic tank, the first output port thereof is connected to a first adjusting pressure chamber of a variation device and the second output port thereof is connected to a second adjusting pressure chamber of the device, and wherein the variation of the first hydraulic pump in terms of the swiveling direction and the pressure medium volume delivered at its first port and the pressure medium volume delivered at its second port is effected by means of the variation device.

17. Hydraulic steering system according to claim 16, wherein a low-pressure port of the feed pump is connected by a filter to a hydraulic tank, and the high-pressure port of the feed pump is connected in each case by a non-return valve to a first hydraulic load line, which is connected to the first port of the first hydraulic pump, and to a second hydraulic load line, which is connected to the second port of the first hydraulic pump.

18. Hydraulic steering system according to claim 17, wherein in the first and second hydraulic load lines there is provided in each case a non-return valve.

* * * * *